Sept. 3, 1940.   G. R. OHMART   2,213,884
PISTON ROD CONNECTION
Filed Dec. 1, 1938
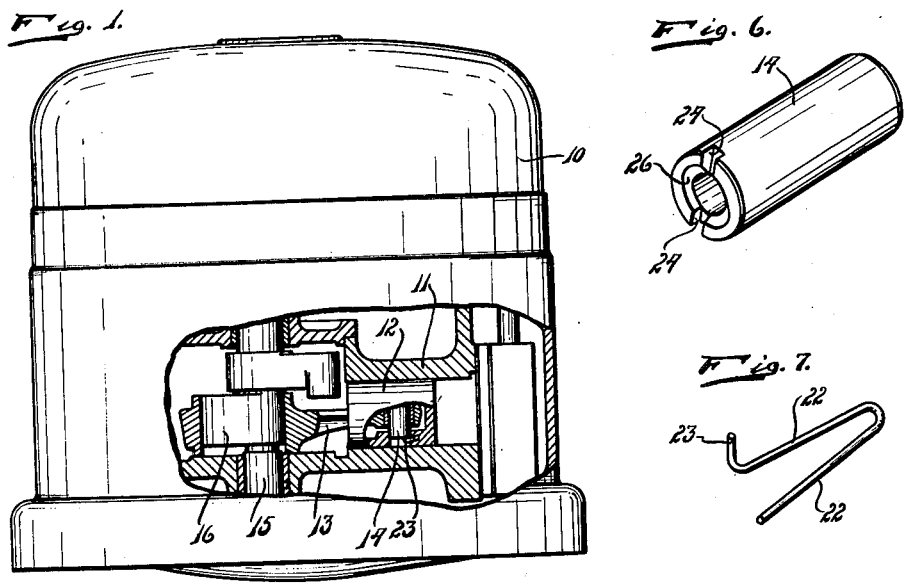
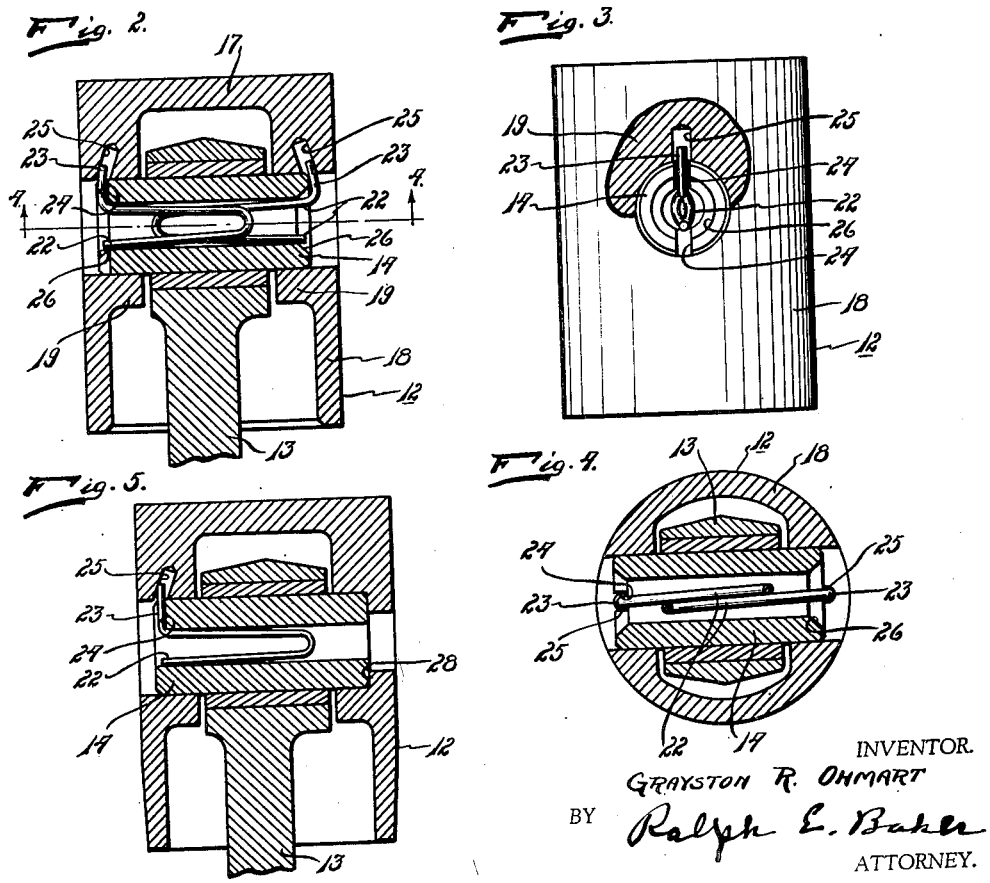
INVENTOR.
GRAYSTON R. OHMART
BY Ralph E. Baker
ATTORNEY.

Patented Sept. 3, 1940

2,213,884

UNITED STATES PATENT OFFICE 2,213,884

PISTON ROD CONNECTION

Grayston R. Ohmart, Detroit, Mich., assignor to Nash-Kelvinator Corporation, Detroit, Mich., a corporation of Maryland Application December 1, 1938, Serial No. 243,320

5 Claims. (Cl. 309—19)

This invention relates to an improvement in pistons, and more particularly to locking devices for the wrist pin.

The invention consists in securing a hollow wrist pin to a piston by a resilient locking device carried by the wrist pin and having engagement with the piston for holding the wrist pin within the piston and against longitudinal movement. The locking device consists of a flexible metal member frictionally held within the bore of the wrist pin, and provided with an angular projection for engaging an end of the wrist pin and extendig into a hole or slot formed in the piston for locking the wrist pin to the piston and retaining it against longitudinal and turning movement in the hole.

The invention consists of certain novel features of construction and combinations of parts which will be hereinafter described and set forth in the appended claims.

In the accompanying drawing;

Fig. 1 is a view partly in elevation and partly in section showing a sealed casing for a refrigerant compressor to which the invention may be applied;

Fig. 2 is a vertical sectional view of a piston showing the invention applied thereto;

Fig. 3 is a view in side elevation of a piston and showing a portion in section to illustrate the manner of locking the wrist pin in position;

Fig. 4 is a horizontal sectional view through the piston and wrist pin;

Fig. 5 is a vertical sectional view of a piston illustrating a modified form of the invention;

Fig. 6 is a perspective view of the wrist pin; and

Fig. 7 is a perspective view of the locking device.

In the drawing is illustrated a sealed casing 10, in which is mounted a cylinder 11 of a compressor, and in which a piston 12 reciprocates. A pitman or connecting rod 13 is journaled on a wrist pin 14 carried by the piston. A drive shaft 15 having an eccentric 16 thereon is connected to the pitman for operating the same and causing the piston 12 to be reciprocated within the cylinder. The drive shaft is driven by an electric motor (not shown) confined within the casing 10.

The piston 12 may be of any approved type, consisting of a head 17 and skirt 18, and the skirt being provided with wrist pin bosses 19, 19. The wrist pin 14 is preferably hollow and cylindrical in shape and is of less length than the transverse diameter of the piston so that the ends of the pin will not project beyond the wall of the piston and contact the cylinder wall. In fact, it is preferred that the ends of the pins be positioned and terminate a considerable distance from the wall of the piston within the bosses 19.

The wrist pin is locked to the piston 12 by a resilient key including a piece of metal bent intermediate its ends into substantially a V-shape and forming two legs 22, 22, which may be compressed toward each other for insertion into an end of the wrist pin. The free end of one of the legs is bent outwardly at an angle forming a tongue or projection 23, which projects through a radial slot 24 formed in the end of the wrist pin. The bosses 19 are provided with obliquely extending holes or slots 25, which extend from the bores thereof vertically and in an inwardly direction toward the vertical axis of the piston. The wrist pin is disposed within the bosses 19 so that the ends thereof project sufficiently across the openings or holes 25 to bring the radial slots 24 in alinement with the holes 25. This arrangement permits the projections 23 of the legs 22 to enter the holes 25 and to engage the outermost walls of these holes. The tongues or projections 23 are not of the same configuration as the holes 25 but due to their flexibility or resiliency will conform somewhat to the shape of the holes 25 and securely lock the wrist pin within the bosses against longitudinal movement. The bore of the wrist pin is preferably countersunk as at 26 to afford a bearing surface at the ends of the pin to permit of the more readily flexing of the tongues 23 in their engagement with the walls of the holes 25 of the bosses 19.

In Fig. 5, the bore of one of the bosses 19 is provided with a shoulder 28 for engagement with an end of the wrist pin, and the other boss is provided with the hole 25 for the reception of the tongue 23. In this instance a single key is provided whereas in the other form shown two keys are employed.

In both constructions, the key is of such resiliency that the legs are when inserted in the bore of the wrist pin 14 constantly pressing outwardly against the wall of the bore of the wrist pin, and this action urges the projection or tongue 23 into the slot or hole 25. The slots or holes 25 are obliquely disposed with respect to the slot 24 of the wrist pin and therefore when the projection 23 enters the hole 25 there is no play or relative movement of the projection with respect to the hole 25, but instead there is a frictional engagement between the tongue or projection with the wall of the hole 25 which insures the wrist pin being held against any substantial longitudinal or turning movement.

What I claim is:

1. A piston comprising a body having wrist pin bosses, a hollow wrist pin mounted in said bosses, a resilient key mounted in said wrist pin and provided with an angular projection, said wrist pin having a slot therein through which said projection extends, one of said bosses having a hole therein extending obliquely to said slot for the reception of said projection, said projection disposed in said oblique hole at an angle with respect to the longitudinal axis of said hole and having frictional engagement with said wall of said hole for locking the wrist pin against turning and longitudinal movement.

2. A piston comprising a head and a skirt, bosses carried by said skirt, a wrist pin mounted in said bosses and having an axial opening, locking keyes each including a pair of metal legs resiliently connected together received in said axial opening and frictionally secured to said wrist pin, a projection on one of the legs of each key, said pin having radial openings through which said projections extend, said bosses provided with holes extending obliquely to the longitudinal axis of said piston and in a direction toward each other, and arranged in alinement with the radial openings of the pin for the reception of said projections for locking the wrist pin to the piston and retaining it against longitudinal and rotary movement.

3. A piston comprising a head and skirt, bosses formed in said skirt, a wrist pin having an axial opening mounted in said bosses, a shoulder formed on one of the bosses for engaging an end of the pin for limiting its movement, a locking key inserted in said axial opening of the pin including two legs resiliently connected together, said legs engaging the walls of said opening for frictionally connecting the key to said pin, said pin having a radial slot at one end, a projection on one of said legs extending through said radial slot, said other boss having an oblique hole formed therein for the reception of said projection for locking the wrist pin to said piston.

4. A piston comprising a head and a skirt, bosses carried by said skirt, one of said bosses having a hole formed therein extending in an oblique direction with respect to the longitudinal axis of said piston, a wrist pin mounted in said bosses and provided with an axial opening, a resilient key including diverging legs resiliently connected together mounted in said axial opening of the wrist pin, one of said legs engaging a wall of said pin, and a projection on the other leg of the key extending into said hole and disposed therein at an angle with respect to the longitudinal axis of said hole for locking the pin to said piston.

5. A piston comprising a head and a skirt, bosses carried by said skirt, a wrist pin mounted in said bosses and provided with an axial opening, a locking key comprising a pair of legs resiliently connected together received in said axial opening and frictionally secured to said wrist pin, a projection on one of the legs of said key, one of said bosses having a hole formed therein extending diagonally to the longitudinal axis of said piston and said key projection, said projection extending into said hole and engaging a wall thereof for locking the wrist pin to said piston.

GRAYSTON R. OHMART.